Figure 1:
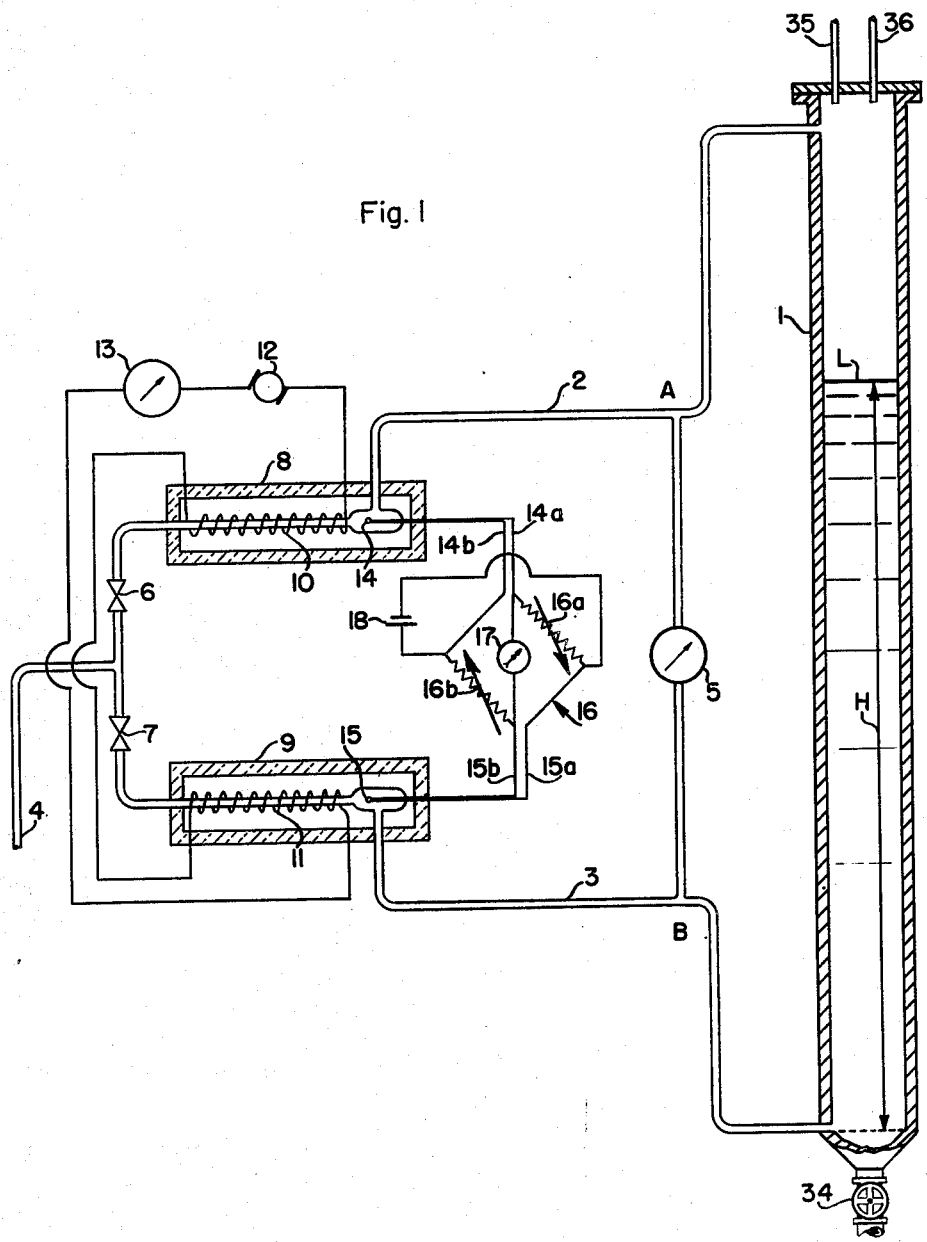

March 31, 1953    K. B. BREDTSCHNEIDER ET AL    2,633,021

LIQUID LEVEL INDICATOR

Filed April 25, 1951                      2 SHEETS—SHEET 1

INVENTORS
Kurt B. Bredtschneider
Hanns Schappert
BY
ATTORNEY

March 31, 1953    K. B. BREDTSCHNEIDER ET AL    2,633,021
LIQUID LEVEL INDICATOR Filed April 25, 1951      2 SHEETS—SHEET 2

INVENTORS
Kurt B. Bredtschneider
Hanns Schappert
BY *Donald G. Leslie*
ATTORNEY

Patented Mar. 31, 1953

2,633,021

UNITED STATES PATENT OFFICE 2,633,021

LIQUID LEVEL INDICATOR

Kurt B. Bredtschneider, Chicago, Ill., and Hanns Schappert, Pittsburgh, Pa., assignors to the United States of America as represented by the Secretary of the Interior Application April 25, 1951, Serial No. 223,691

9 Claims. (Cl. 73—302)

The invention herein described and claimed may be manufactured and used by or for the Government of the United States of America for governmental purposes without the payment of royalties thereon or therefor.

This invention is concerned with a device for indicating the level of a liquid in a container. The device of the invention is particularly suitable where the liquid in question is contaminated with solids, or where the liquid has a tendency towards the deposition of solids on surfaces with which it is in contact. The device likewise has particular application for the measurement of liquid levels in vessels under pressure.

In the measurement of liquid levels where the liquid involved has a tendency to deposit solids upon surfaces with which it is in contact, many commonly used devices such as glass gauges, are obviously not applicable. Likewise, in the measurement of liquid levels in vessels under extremely high pressures, the use of conventional devices and methods are unsatisfactory or unworkable. Where these two difficulties coexist, the problem of measuring the liquid level is particularly difficult. Such a situation is encountered, for example, in the high pressure conversion of coal to liquid hydrocarbons by direct hydrogenation. In this process, the asphaltic, nondistillable products of the hydrogenation are collected in a vessel called the hot catchpot, maintained at a pressure in the order of 10,000 pounds per square inch and at a temperature of 300° to 400° C. The high pressures involves, and the fact that the asphaltic material in the vessel is a viscous liquid contaminated with solids, having a strong tendency to form coke on the walls of the vessel, makes the problem of measuring the liquid level in this vessel very difficult.

To overcome the difficulty involved in situations such as this, it has been proposed to measure the liquid level by simultaneously injecting two fluid streams into the vessel, one above, and one below the liquid level therein, and to measure the difference in pressure between the two fluid streams as an indication of the hydrostatic head of liquid in the vessel. This method has the advantage that the fluid streams act to purge the instrument lines and keep them free from extraneous matter. The use of this method however, involves the necessity of maintaining the proper relationship between the rate of flow of fluid in the separate streams flowing into the vessel above and below the liquid level respectively, the control of this relationship being necessary to prevent the differential pressure between the two streams from being effected by differences in velocity head in the separate streams. Because of the difficulty involved in maintaining the proper flow relationship between the separate streams which, for economic reasons, must use relatively small quantities of fluid, this method for indicating liquid levels has not been entirely satisfactory in operation. The use of orifice plates for maintaining this relationship has been found unsatisfactory since the small orifices having a diameter, for example, of .05 mm. are easily clogged by extraneous matter in the fluid streams causing the instrument to lose its calibration. Likewise, the use of propeller wheel-type flow meters or similar devices is unsatisfactory for regulating the small quantities of fluid involved since bearing friction introduces large errors into the system.

The purpose of the present invention is to provide a device for indicating liquid levels, involving the injection of separate streams of fluid above and below the liquid level respectively, which will overcome the difficulties connected with maintaining the proper relationship between the separate fluid streams, and which when once calibrated, will maintain its calibration over long periods of use. Other purposes and advantages of the invention will be apparent from the subsequent detailed description.

Stated in general terms, this invention involves the injection of separate streams of fluid, derived from a common source, into a container above and below the liquid level therein. Separate cooling or heating means are arranged in heat exchange relationship with each of these fluid streams for adding heat to, or extracting heat from, these streams in quantities having a constant ratio. Temperature differentials between the fluid streams resulting from this heat exchange are detected by means provided in each of the fluid streams at points following these heat exchangers. The temperature differential between the streams at these points is an indication of their rate of flow relative to one another. By controlling the rate of flow in accordance with the indicated temperature differential, the proper flow relationship between the two streams is maintained such that a differential pressure gage connected across the separate streams will not be influenced by differences in velocity head between the two streams, but will indicate only the back pressure created by the head of liquid in the container.

Figure 2:
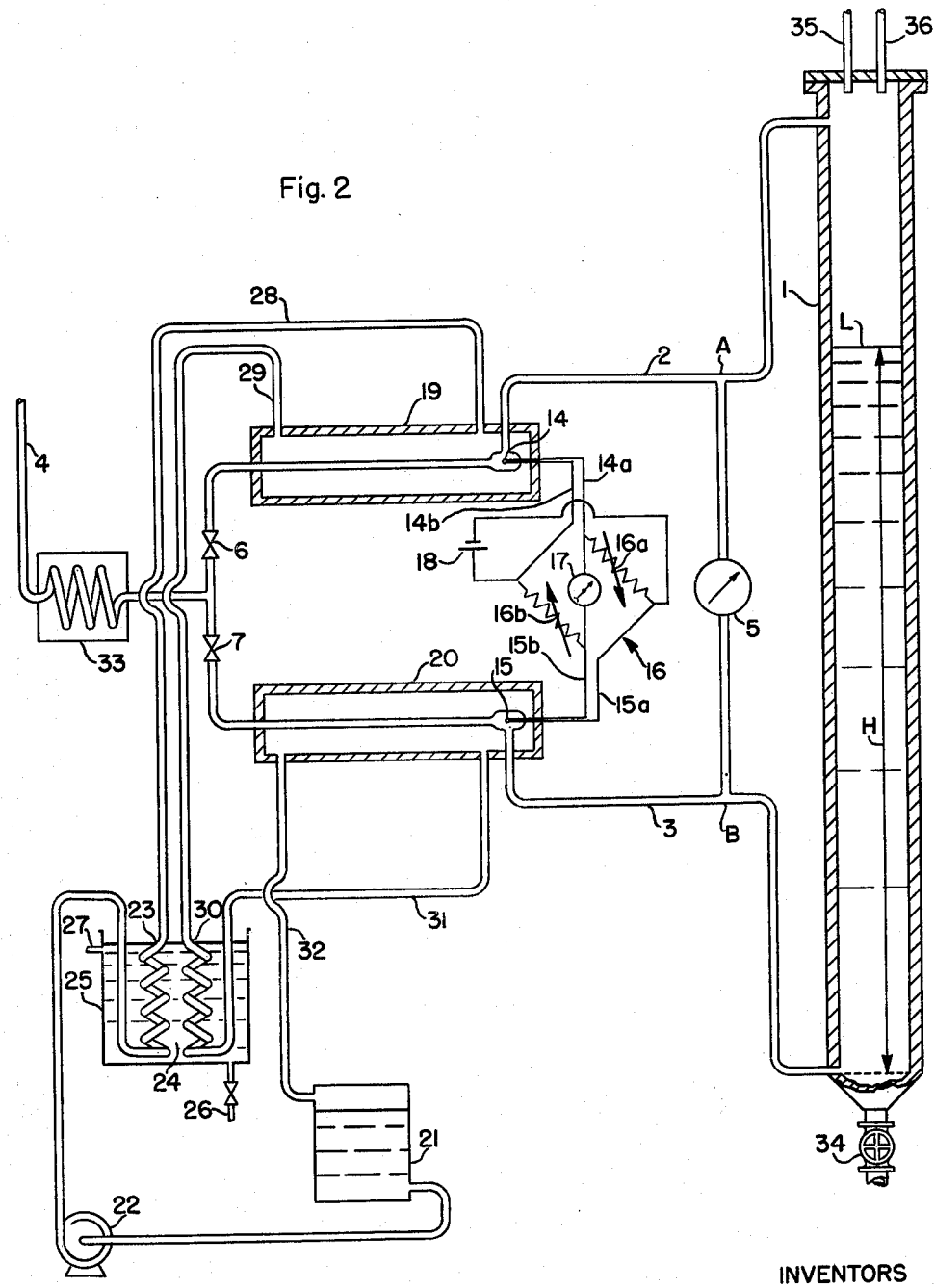

For a better understanding of the invention, and for a description of specific embodiments thereof, reference is now made to the accompanying drawing wherein:

Fig. 1 is a semidiagrammatic illustration of one embodiment of the invention; and, Fig. 2 is a semidiagrammatic illustration of a second embodiment of the invention.

Referring now particularly to Fig. 1, reference numeral 1 refers to a closed vessel having a liquid inlet 35 and a gas outlet 36 and having a liquid in the lower portion thereof and a gas under pressure in the upper portion. Leading into the upper portion of the vessel, conduit 2 is provided for injecting a fluid stream, in this case, a gas stream above the normal maximum liquid level. Leading into the lower portion of the vessel, conduit 3 is provided for injecting a second gas stream below the normal minimum liquid level. A common conduit 4 connects the individual conduits 2 and 3 to a source of gas (not shown) at a pressure slightly greater than the gas pressure in the vessel 1. Across the conduits 2 and 3 there is connected a differential pressure gauge 5 for measuring pressure differential existing between the gas streams flowing in conduits 2 and 3 at points A and B respectively in these conduits. Valves 6 and 7 are provided in conduits 2 and 3, respectively for controlling the flow of gas in these conduits.

A heat insulating jacket 8 is provided around a portion of conduit 2, while a similar heat insulating jacket 9 is provided around a portion of the conduit 3. Within the jacket 8, an electrical resistance 10 is disposed in heat transfer relationship with the gas stream flowing in the conduit 2. As shown in the drawing, the resistance 10 is wrapped in helical form around a portion of the conduit. Within the jacket 9, a second electric resistance 11 is similarly disposed in heat transfer relationship with the gas stream flowing in conduit 3. The resistances 10 and 11 are connected in series to a common power source 12. Conveniently, an ammeter 13 may be provided for indicating the amount of current flowing in resistances 10 and 11.

At points following the electrical resistances 10 and 11, thermocouples 14 and 15 are provided in heat exchange relationship with the gas streams flowing in conduits 2 and 3, respectively. Thermocouple 14 is connected by leads 14a and 14b to one side of a bridge circuit 16, while thermocouple 15 is connected by leads 15a and 15b to the opposite side of the bridge 16 as shown in the drawing. Current is supplied to the bridge 16 by battery 18, connected as shown to variable resistances 16a and 16b. An instrument 17, which may be a galvanometer or other suitable instrument for detecting the flow of a small amount of current, is connected across the bridge as shown.

The operation of a device shown in Fig. 1 will now be explained. Gas is supplied by conduit 4 and flows into conduits 2 and 3 at rates which may be controlled in each conduit by valves 6 and 7 respectively. The gas flowing through conduits 2 and 3 and into vessel 1 acts as a purge for these conduits, preventing them from becoming clogged by solids deposited from the liquid contained in the vessel or by other causes. Basically, the device operates on the principle that the head of liquid in the vessel above the point of injection of the lower stream will cause a back pressure on this stream. This back pressure will show up as a differential pressure between the two streams which may be measured by a differential pressure gage 5 connected across these streams at points A and B for example. If the differential pressure between lines 2 and 3 at points A and B respectively, is that due solely to the head of liquid H above the point of injection of the lower stream of gas, then knowing the density of the liquid, the differential pressure gauge 5 may be calibrated to indicate the height of liquid above the point of injection of the lower stream. However, since there is a gas flow in conduits 2 and 3, the differential pressure between points A and B will depend not only on the head of liquid in the vessel, but will also depend upon the relative velocities of the gas streams in conduits 2 and 3, as well as the relative lengths and diameters of conduits 2 and 3, in accordance with the well known law that the pressure drop across a length of pipe carrying a moving fluid is equivalent to:

$$\Delta p = \frac{R l V^2 S}{2 d g}$$

where $\Delta p$=pressure drop; $R$=the Reynolds number; $l$=length of pipe; $d$=diameter of pipe; $V$=the linear velocity of fluid in the pipe; $g$=acceleration due to gravity; $S$=specific weight of the fluid.

As a consequence of this relationship, the system must be regulated so that the differential pressure between points A and B will always be zero except for the back pressure created by the head of liquid in the vessel and this is done by adjusting the ratio of gas velocities in conduits 2 and 3 to the proper value.

The initial calibration of the device to determine the proper ratio of gas velocities in conduits 2 and 3 is made using an empty vessel, since with no liquid in the vessel, the pressure differential between points A and B, as shown on the gage 5, will depend only on the ratio of gas velocities in conduits 2 and 3 and will not be affected by back pressure due to a head of liquid. Thus, with an empty vessel, the ratio of gas velocities in conduits 2 and 3 is adjusted by regulating either or both of valves 6 and 7, until a ratio is found such that the differential pressure between points A and B, as indicated on the gage 5, is equal to zero.

When the zero reading on the differential pressure gage 5 is obtained in this manner, the flow of current through series connected resistances 10 and 11 is started, if this has already not been done, thereby adding heat to the gas streams. Since resistances 10 and 11 are series connected, the current flowing in each will be in a constant ratio, and consequently the ratio of heat input to the respective gas streams will likewise be constant. Since the gas streams flowing in conduits 2 and 3 are supplied at an equal temperature from the common conduit 4, and since the ratio of heat input to these streams is also constant, the temperature differential between these streams will vary as the ratio of gas velocities in the two streams varies, in essentially direct proportion. Consequently, the difference in potential between the thermocouples 14 and 15 in response to temperature differential between the gas streams, will indicate the ratio of velocities in the two streams.

These differences in potential between thermocouples 14 and 15 will affect the balance of the bridge 16. If the bridge is brought into balance by suitable adjustment of variable resistances 16a and 16b while a zero pressure differential is observed across points A and B with an empty vessel, the balanced condition of the bridge will be a reference point for indicating when the proper ratio of gas velocities exists in conduits 2 and 3.

When taking subsequent measurements with a head of liquid in the vessel, the back pressure in the lower conduit 3 due to the head of liquid will disturb the ratio of gas velocities in conduits 2 and 3 which was established while using an empty vessel in the manner described above, and consequently will also disturb the balance of bridge circuit 16. Reestablishment of the velocity ratio to the proper value is accomplished by regulating either or both of valves 6 and 7 until the bridge circuit 16 has been brought back into balance. When this is done the differential pressure gage 5 will indicate the true back pressure due to the head of liquid in the vessel.

It is to be clearly understood, of course, that the bridge circuit 16 is balanced by adjusting variable resistances 16a and 16b only during the initial calibration using an empty vessel. Subsequently, during actual liquid level measurements, the bridge circuit is kept in balance by regulating the flow of gas in conduits 2 and 3 by controlling either or both of valves 6 and 7.

If desired, valves 6 and 7 may be manually operated. For automatic control, however, one of these valves may be a motor valve controlled by the bridge circuit 16, such that when the bridge 16 is unbalanced, the motor valve will be actuated in such a manner as to reestablish the proper ratio of gas velocities in conduits 2 and 3, thus automatically bringing the bridge back into balance. In this way, the need for balancing the bridge circuit each time a liquid level reading is made on gage 5, as is the case when valves 6 and 7 are manually operated, is eliminated. The proper velocity ratio is automatically maintained as the liquid level rises and falls, and consequently gage 5 constantly indicates the true liquid level.

Reference is now made to Fig. 2 which shows an embodiment of the invention similar to that shown in Fig. 1 except, that instead of adding heat to the gas streams flowing in individual conduits 2 and 3 in quantities having a constant ratio, heat is extracted from these gas streams in a constant ratio. Instead of electrical resistances, means are provided for passing a cooling fluid in heat exchange relationship with each of the gas streams flowing in individual conduits 2 and 3. A jacket 19 is provided around a portion of conduit 2, and a similar jacket 20 is provided around a portion of conduit 3. A cooling fluid, preferably a liquid, is pumped in series through jackets 19 and 20.

From reservoir 21, the cooling fluid is conducted by means of pump 22 through a coil 23 immersed in a cooling bath 24 contained in a vessel 25. The cooling bath liquid is pumped into vessel 25 through line 26 at such a rate that equal temperature conditions are maintained throughout the bath. Overflow from the bath flows out of the vessel 25 through line 27. The coil 23 is of such a size that the fluid flowing in the coil reaches thermal equilibrium with the cooling bath 24 before leaving the bath, and consequently leaves at the same temperature as the bath.

After passing through coil 23, the cooling fluid is conducted by line 28 into jacket 19, and flows in thermal contact with conduit 2 countercurrently to the gas stream flowing therein. The cooling fluid is withdrawn from jacket 19 by line 29 and is conducted to a second coil 30 likewise immersed in cooling bath 24, and likewise being of sufficient size so that the cooling fluid flowing therein reaches thermal equilibrium with the bath. After leaving coil 30, the cooling fluid is conducted by line 31 to jacket 20 where it flows in thermal contact with conduit 3 countercurrently to the gas flowing in this conduit, and is withdrawn from jacket 20 by line 32 and conducted back to the reservoir 21.

With this arrangement, cooling fluid is introduced into jackets 19 and 20 at the same temperature, and since the jackets 19 and 20 are series connected, cooling fluid flows through these jackets at the same rate. Consequently, heat is extracted from the gas streams flowing in conduits 2 and 3 in quantities having a constant ratio. Since the gas flowing in conduits 2 and 3 is supplied by conduit 4 at the same temperature, the temperature differential between the gas streams in conduits 2 and 3 as a result of this heat exchange will indicate the relative velocity of the gas streams in these conduits, as in the previously described embodiment shown in Fig. 1. This temperature differential is detected by means of thermocouples 14 and 15 with the help of the bridge circuit 16 as in the previously described embodiment. If desired, the temperature differential between the gas streams flowing in conduits 2 and 3 and the cooling fluid flowing in jackets 19 and 20 may be increased by preheating the gas stream flowing in conduit 4 by means of a heater 33, for example.

Operation of the embodiment shown in Fig. 2 is identical with that shown in Fig. 1 and therefore need not be described in detail. Thus, the proper flow relationship through conduits 2 and 3 is initially obtained with an empty vessel by regulating either or both of valves 6 and 7 until a zero reading is obtained on differential pressure gage 5. The bridge circuit 16 is then balanced by adjusting variable resistances 16a and 16b, and thereafter, during actual liquid level measurements, the bridge circuit is kept in balance, and the proper flow relationship maintained, by regulating either or both of valves 6 and 7.

It is to be understood, of course, that the embodiments shown in the drawing and described above are merely illustrative of the invention and that many variations of the invention are possible. For example, any suitable means may be employed for exchanging heat with the fluid streams flowing in the individual conduits so long as heat is exchanged with these streams in quantities having a constant ratio. Similarly, any suitable means other than that described may be employed for detecting temperature differential between the fluid streams flowing in the individual conduits, although the thermocouples and bridge circuit system is particularly advantageous since it is quite sensitive and may be easily adapted for automatic control.

It is also to be understood that although only one method of operating the device has been described, variations of this method of operation are possible within the scope of the invention. For example, in addition to indicating the liquid level, the device may also be modified to automatically control the liquid level at any desired point. This is made possible by the fact that as the liquid level in vessel 1 varies, it tends to change the flow relationship of the gas streams in conduits 2 and 3 and consequently tends to affect the balance of bridge circuit 16. Consequently, instead of keeping the bridge circuit 16 in balance by regulating either or both of valves 6 and 7 as the liquid level rises and falls, the bridge circuit may be kept in balance by maintaining a constant level of liquid in the vessel 1. Regulation of the liquid level may be accomplished by regulating the rate of withdrawal of liquid from and/or the rate of feed of liquid to the vessel. For example, if liquid is introduced into vessel 1 at a varying rate through conduit 35, a predetermined level L of liquid in the vessel may be maintained by regulating the outlet valve 34 in such a manner as to keep the bridge circuit 16 in balance. If desired, of course, the valve 34 may be a motor valve automatically controlled by bridge circuit 16 through suitable instrumentation to open and close as the liquid level in vessel rises above or falls below, respectively, the level L.

Instead of dividing the stream flowing in conduit 4 into two separate streams, this stream may be divided into three or more separate streams to be injected into the container at vertically spaced points, at least one of these individual streams being injected above, and one below the liquid level in the container. By connecting differential pressure gages across selected pairs of these individual conduits, and by maintaining the proper flow relationship between the fluid streams in each of these individual conduits in the manner described above, the proper operation of any selected pair of conduits may be checked against another pair to guard against the faulty operation of the device, occasioned, for example, by plugging of one of the lines.

It is to be understood that the above description, together with the specific examples and embodiments described, is intended merely to illustrate the invention, and that the invention is not to be limited thereto, nor in any way except by the scope of the appended claims.

We claim:

1. A device for indicating the level of a liquid in a container comprising an individual conduit for separately injecting a stream of fluid into the container above the normal maximum liquid level therein, a second individual conduit for separately injecting a second stream of fluid into the container below the normal minimum liquid level therein, a common conduit connecting said individual conduits to a supply of fluid, means for detecting pressure differential existing between the fluid streams flowing in said individual conduits, means arranged in heat transfer relationship with each of the fluid streams flowing in said individual conduits for exchanging heat with each of said streams in quantities having a constant ratio, means for detecting temperature differentials between the fluid streams in said individual conduits at points in said streams following said heat exchange means, and means for controlling the flow of fluid in at least one of said individual conduits in accordance with the magnitude of the temperature differential between said fluid streams so as to maintain the proper flow ratio between said streams.

2. A device for indicating the level of a liquid in a container comprising an individual conduit for separately injecting a stream of fluid into the container above the normal maximum liquid level therein, a second individual conduit for separately injecting a second stream of fluid into the container below the normal minimum liquid level therein, a common conduit connecting said individual conduits to a supply of fluid, means for detecting pressure differential existing between the fluid streams flowing in said individual conduits, heating means arranged in heat transfer relationship with each of the fluid streams flowing in said individual conduits for adding heat to each of said streams in quantities having a constant ratio, means for detecting temperature differentials between the fluid streams in said individual conduits at points in said streams following said heat exchange means, and means for controlling the flow of fluid in at least one of said individual conduits in accordance with the magnitude of the temperature differential between said fluid streams so as to maintain the proper flow ratio between said streams.

3. A device for indicating the level of a liquid in a container comprising an individual conduit for separately injecting a stream of fluid into the container above the normal maximum liquid level therein, a second individual conduit for separately injecting a second stream of fluid into the container below the normal minimum liquid level therein, a common conduit connecting said individual conduits to a supply of fluid, means for detecting pressure differential existing between the fluid streams flowing in said individual conduits, heating means comprising separate electric resistances arranged in heat transfer relationship with each of the fluid streams flowing in said individual conduits, said resistances being connected in series to a common power source for adding heat to each of said streams in quantities having a constant ratio, means for detecting temperature differentials between the fluid streams in said individual conduits at points in said streams following said heating means, and means for controlling the flow of fluid in at least one of said individual conduits in accordance with the magnitude of the temperature differential between said fluid streams so as to maintain the proper flow ratio between said streams.

4. A device for indicating the level of a liquid in a container comprising an individual conduit for separately injecting a stream of fluid into the container above the normal maximum liquid level therein, a second individual conduit for separately injecting a second stream of fluid into the container below the normal minimum liquid level therein, a common conduit connecting said individual conduits to a supply of fluid, means for detecting pressure differential existing between the fluid streams flowing in said individual conduits, means arranged in heat transfer relationship with each of the fluid streams flowing in said individual conduits for exchanging heat with each of said streams in quantities having a constant ratio, thermocouples disposed in heat exchange relationship with the fluid streams flowing in each of said individual conduits at points in said streams following said heat exchange means for detecting temperature differentials between the two streams, and means for controlling the flow of fluid in at least one of said individual conduits in accordance with the magnitude of the temperature differential between said fluid streams so as to maintain the proper flow ratio between said streams.

5. A device for indicating the level of a liquid in a container comprising an individual conduit for separately injecting a stream of fluid into the container above the normal maximum liquid level therein, a second individual conduit for separately injecting a second stream of fluid into the container below the normal minimum liquid level therein, a common conduit connecting said individual conduits to a supply of fluid, means for detecting pressure differentials existing between fluid streams flowing in said individual conduits, means arranged in heat transfer relationship with each of the fluid streams flowing in said individual conduits for exchanging heat with each of said streams in quantities having a constant ratio, thermocouples disposed in heat exchange relationship with the fluid streams flowing in each of said individual conduits at points in said streams following said heat exchange means, said thermocouples being operatively connected to a bridge circuit for detecting differences in potential between said thermocouples in response to temperature differentials between the two fluid streams, and means for controlling the flow of fluid in at least one of said individual conduits in accordance with the magnitude of the temperature differential between said fluid streams so as to maintain the proper flow ratio between said streams.

6. A device for indicating the level of a liquid in a container comprising an individual conduit for separately injecting a stream of fluid into the container above the normal maximum liquid level therein, a second individual conduit for separately injecting a second stream of fluid into the container below the normal minimum liquid level therein, a common conduit connecting said individual conduits to a supply of fluid, means for detecting pressure differentials existing between the fluid streams flowing in said individual conduits, cooling means arranged in heat transfer relationship with each of the fluid streams flowing in said individual conduits for extracting heat from each of said streams in quantities having a constant ratio, means for detecting temperature differentials between the fluid streams in said individual conduits at points in said streams following said cooling means, and means for controlling the flow of fluid in at least one of said individual conduits in accordance with the magnitude of the temperature differential between said fluid streams so as to maintain the proper flow ratio between said streams.

7. A device for indicating the level of a liquid in a container comprising an individual conduit for separately injecting a stream of fluid into the container above the maximum liquid level therein, a second individual conduit for separately injecting a second stream of fluid into the container below the minimum liquid level therein, a common conduit connecting said individual conduits to a supply of fluid, means for detecting pressure differentials existing between the fluid streams flowing in said individual conduits, separate cooling means for passing a cooling fluid in heat exchange relationship with each of said individual conduits, said separate cooling means being arranged in series with respect to the flow of said cooling liquid, common cooling means for maintaining equal temperatures at the cooling fluid inlet to each of said separate cooling means, means for detecting temperature differentials between the fluid streams in said individual conduits at points in said streams following said cooling means, and means for controlling the flow of fluid in at least one of said individual conduits in accordance with the magnitude of the temperature differential between said fluid streams so as to maintain the proper flow ratio between said streams.

8. A device for indicating the level of a liquid in a container comprising an individual conduit for separately injecting a stream of fluid into the container above the maximum liquid level therein, a second individual conduit for separately injecting a second stream of fluid into the container below the minimum liquid level therein, a common conduit connecting said individual conduits to a supply of fluid, means for detecting pressure differentials existing between the fluid streams flowing in said individual conduits, heating means comprising separate electric resistances arranged in heat transfer relationship with each of the fluid streams flowing in said individual conduits, said resistances being connected in series to a common power source for adding heat to each of said streams in quantities having a constant ratio, thermocouples disposed in heat exchange relationship with the fluid streams flowing in each of said individual conduits at points in said streams following said heating means, said thermocouples being operatively connected to a bridge circuit for detecting differences in potential between said thermocouples in response to temperature differential between the two fluid streams, and means for controlling the flow of fluid in at least one of said individual conduits in accordance with the magnitude of the temperature differential between said fluid streams so as to maintain the proper flow ratio between said streams.

9. A device for indicating the level of a liquid in a container comprising an individual conduit for separately injecting a stream of fluid into the container above the maximum liquid level therein, a second individual conduit for separately injecting a second stream of fluid into the container below the minimum liquid level therein, a common conduit connecting said individual conduits to a supply of fluid, means for detecting pressure differential existing between the fluid streams flowing in said individual conduits, separate cooling means for passing a cooling fluid in heat exchange relationship with each of said individual conduits, said separate cooling means being arranged in series with respect to the flow of said cooling fluid, common cooling means for maintaining equal temperatures at the cooling fluid inlet to each of said separate cooling means, thermocouples disposed in heat exchange relationship with the fluid streams flowing in each of said individual conduits at points in said streams following said cooling means, said thermocouples being operatively connected to a bridge circuit for detecting differences in potential between said thermocouples in response to temperature differential between the two fluid streams, and means for controlling the flow of fluid in at least one of said individual conduits in accordance with the magnitude of the temperature differential between said fluid streams so as to maintain the proper flow ratio between said streams.

KURT B. BREDTSCHNEIDER.
HANNS SCHAPPERT.

REFERENCES CITED

The following references are of record in the file of this patent:

UNITED STATES PATENTS

| Number | Name | Date |
| --- | --- | --- |
| 2,214,181 | Rylsky | Sept. 10, 1940 |
| 2,331,208 | Ludi | Oct. 5, 1943 |
| 2,552,017 | Schwartz | May 8, 1951 |